US011178862B1

(12) United States Patent
Forrester

(10) Patent No.: US 11,178,862 B1
(45) Date of Patent: Nov. 23, 2021

(54) SPRING-LOADED FISHING POLE HOLDER AND METHOD OF OPERATION

(71) Applicant: Raymond D. Forrester, Tule Lake, CA (US)

(72) Inventor: Raymond D. Forrester, Tule Lake, CA (US)

(73) Assignees: Raymond D. Forrester, Tulelake, CA (US); Ellen E. Forrester, Tulelake, CA (US)

( * ) Notice: Subject to any disclaimer, the term of this patent is extended or adjusted under 35 U.S.C. 154(b) by 171 days.

(21) Appl. No.: 16/686,285

(22) Filed: Nov. 18, 2019

Related U.S. Application Data

(60) Provisional application No. 62/895,395, filed on Sep. 3, 2019.

(51) Int. Cl.
*A01K 97/11* (2006.01)

(52) U.S. Cl.
CPC .................................... *A01K 97/11* (2013.01)

(58) Field of Classification Search
CPC ................................ A01K 97/11; A01K 91/10
USPC .......................................................... 43/15–16
See application file for complete search history.

(56) References Cited

U.S. PATENT DOCUMENTS

| 2,642,690 | A | * | 6/1953 | Soenksen | A01K 97/11 43/15 |
| 2,744,351 | A | * | 5/1956 | Smith | A01K 97/11 43/16 |
| 2,770,906 | A | * | 11/1956 | Hood | A01K 97/11 43/16 |
| 2,784,516 | A | * | 3/1957 | Barnes | A01K 97/11 43/16 |
| 2,804,277 | A | * | 8/1957 | Kinder | A01K 97/11 43/16 |
| 2,835,065 | A | * | 5/1958 | Schwartzkopf | A01K 97/11 43/15 |
| 2,986,834 | A | | 7/1959 | Irwin | |
| 2,917,858 | A | * | 12/1959 | Ikeuchi | A01K 97/11 43/17 |

(Continued)

FOREIGN PATENT DOCUMENTS

| CA | 2268232 A1 * | 10/1999 | ............. A01K 97/11 |
| FR | 2188948 A1 * | 1/1974 | ............. A01K 97/11 |

(Continued)

*Primary Examiner* — Darren W Ark
(74) *Attorney, Agent, or Firm* — Jerry Haynes Law

(57) ABSTRACT

A spring-loaded fishing pole holder and method of operation retains a fishing pole in a fishing position by a tension-adjustable, interchangeable spring, and upon mechanical detection of the fish taking the bait, a trigger subassembly triggers the fishing rod to automatically articulate upward to a hooked position using the tension load applied by the spring; whereby the fishing pole may then be removed from the device to manually reel in the fish. A height adjustable stand mounts the device on ground surface. A pole-retention tube receives the handle of the fishing pole. A motion-sensitive line retention bar creates a counter-tension to the tension load on the tube support bar, whereby upon detection of a force exerted on the fishing line, a trigger lever disengages from the fishing line, causing the counter-tension to be removed, and the pole holder to automatically snap back to a release hooked position.

20 Claims, 5 Drawing Sheets

(56) References Cited

U.S. PATENT DOCUMENTS

| | | | | |
|---|---|---|---|---|
| 2,931,121 A * | 4/1960 | Torbett | A01K 97/11 43/15 |
| 2,964,868 A * | 12/1960 | Pearlg | A01K 97/11 43/15 |
| 3,170,262 A * | 2/1965 | Hall | A01K 97/11 43/15 |
| 3,699,701 A * | 10/1972 | Jacobs | A01K 97/11 43/15 |
| 3,837,109 A * | 9/1974 | DeJulio | A01K 97/11 43/15 |
| 4,159,589 A * | 7/1979 | Pendegraft | A01K 97/11 43/15 |
| 4,391,059 A * | 7/1983 | Cordova | A01K 97/11 43/15 |
| 4,397,113 A * | 8/1983 | Pinson | A01K 97/11 43/15 |
| 4,550,519 A * | 11/1985 | Simmons | A01K 97/11 43/15 |
| 4,823,493 A * | 4/1989 | Gray | A01K 97/11 43/15 |
| 4,920,681 A | 5/1990 | Toliver et al. | |
| 5,076,001 A * | 12/1991 | Coon | A01K 97/11 43/15 |
| 5,359,802 A * | 11/1994 | Gutierrez | A01K 97/11 43/15 |
| 5,383,113 A | 1/1995 | Kight et al. | |
| 5,524,376 A * | 6/1996 | Flisak | A01K 97/11 43/15 |
| 5,542,205 A | 8/1996 | Updike | |
| 5,873,191 A | 2/1999 | Bova et al. | |
| 5,903,998 A | 5/1999 | Hawkins et al. | |
| 6,050,020 A * | 4/2000 | Sizemore | A01K 97/11 43/15 |
| 6,088,946 A * | 7/2000 | Simmons | A01K 97/11 248/535 |
| 6,336,287 B1 * | 1/2002 | Lobato | A01K 97/11 43/15 |
| 6,539,662 B2 * | 4/2003 | Heath | A01K 97/11 43/15 |
| 6,681,516 B2 * | 1/2004 | Fayerman | A01K 97/11 43/15 |
| 7,017,296 B2 * | 3/2006 | Templeman | A01K 97/11 43/15 |
| 8,567,108 B1 | 10/2013 | Babbs et al. | |
| 2006/0026891 A1 * | 2/2006 | Witt | A01K 97/11 43/15 |
| 2006/0070290 A1 * | 4/2006 | Toy | A01K 97/11 43/15 |

FOREIGN PATENT DOCUMENTS

| | | | |
|---|---|---|---|
| FR | 2723513 A1 * | 2/1996 | A01K 97/11 |
| FR | 2848069 A1 * | 6/2004 | A01K 97/11 |
| GB | 2275857 A * | 9/1994 | A01K 97/11 |
| JP | 2004254672 A * | 9/2004 | |
| KR | 20060110254 A * | 10/2006 | |

* cited by examiner

SPRING-LOADED FISHING POLE HOLDER AND METHOD OF OPERATION

CROSS-REFERENCE TO RELATED APPLICATIONS

This application claims the benefits of U.S. provisional application No. 62/895,395, filed Sep. 3, 2019 and entitled SPRING-LOADED FISHING POLE HOLDER AND HOOK SETTER ASSEMBLY AND METHOD OF OPERATION, which provisional application is incorporated by reference herein in its entirety.

FIELD OF THE INVENTION

The present invention relates generally to a spring-loaded fishing pole holder and method of operation. More so, the present invention relates to a fishing pole holder and hook setter device that retains a fishing pole in a fishing position by a tension-adjustable, interchangeable spring, and upon mechanical detection of the fish taking the bait, a trigger subassembly triggers the fishing rod to automatically articulate upward to a hooked position using the tension load applied by the spring; whereby the fishing pole may then be removed from the device to manually reel in the fish.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a fishing rod holder is a cylindrical tube, of sorts, that retains a fishing rod in a convenient and easily accessible position for fishing. Often, the fishing rod holder can have multiple tubes vertically mounted to a mounting surface, such as a boat or a bumper of a vehicle. The handle ends of the fishing rods are inserted into the tubes, while the distal ends of the fishing rods extend outwardly towards the body of water. When the fish bites, the fishing rod holder alerts, or snaps back to snag the fish.

It is known in the art that forcible motion from the end of the fishing line, such as when a fish grabs the bait, creates a tense fishing line. This forcible motion consequently causes the line retention bar to pivot forward. The pivoting by the line retention bar causes the first lever end of the trigger lever to disengage from the tube support bar. At this point, the tension load from the spring is released from the pole-retention tube. Free to return to the natural position, the pole-retention tube pivotally articulates to the hooked position, which is effective for snagging the fish with the hook at the end of the fishing line. The fishing pole may then be removed from the pole-retention tube to reel in the fish.

Other proposals have involved fishing rod holders. The problem with these rod holding devices is that they do not magnify the snap-back force necessary to snag the fish with a strong spring tension load. Also, loading the rod holder between fishing and hooked positions is time consuming. Even though the above cited fishing rod holders meet some of the needs of the market, a spring-loaded fishing pole holder and method of operation that retains a fishing pole in a fishing position by a tension-adjustable, interchangeable spring, and upon mechanical detection of the fish taking the bait, a trigger subassembly triggers the fishing rod to automatically articulate upward to a hooked position using the tension load applied by the spring; whereby the fishing pole may then be removed from the device to manually reel in the fish, is still desired.

SUMMARY

Illustrative embodiments of the disclosure are generally directed to a spring-loaded fishing pole holder device and method of operation. The fishing pole holder device is configured to retain a fishing pole in a tensioned fishing position through use of a tension-adjustable, interchangeable spring, and upon mechanical detection of an aquatic specimen manipulating a lure along the fishing line, automatically trigger the fishing pole to pivotally articulate upward to a release hooked position, i.e., snagging the specimen. The fishing pole may then be removed from the device to manually reel in the specimen.

In some embodiments, the holder device comprises a pole-retention tube that is defined by a hollow body, a proximal end, and a distal end. The hollow body is sized and dimensioned to receive a fishing pole carrying a fishing line.

In other embodiments, the holder device further comprises a tube support bar defined by a hinged end and a free end. The tube support bar attaches to the pole-retention tube in an adjacent, parallel relationship. The pole-retention tube is operable to pivot about the hinged end between a tensioned fishing position and a release hook position.

In yet other embodiments, the holder device further comprises a frame bar that supports the tube support bar. The frame bar is hingedly joined with the hinge end of the tube support bar.

In some embodiments, the holder device further comprises a spring that is defined by a spring tension. The spring comprises a rear end and a forward end. The forward end attaches to the pole-retention tube. The spring may include an elongated, coiled member that is configured to apply a tension load on the tube support bar. The tension load biases the tube support bar to the release hook position.

In some embodiments, the holder device further comprises a spring adjustment bar that attaches to the rear end of the spring and the frame bar from opposing ends. The spring adjustment bar is operable to adjust the tension load on the tube support bar.

In other embodiments, the holder device further comprises a motion-sensitive line retention bar that is defined by a line end and a trigger end. The line end works to releasably retain the fishing line in a loosely connected arrangement. The fishing line, being drawn out from the reel of the fishing pool, creates a counter-tension to the tension load on the tube support bar. In this manner, upon detection of a force exerted on the fishing line, the line end disengages from the fishing line, causing the counter-tension to be removed.

In another possible embodiment, the holder device further comprises a trigger lever that is defined by a first lever end and a second lever end. The first lever end detachably attaches to the tube support bar and the trigger end of the line retention bar. In this manner, the connection between the trigger lever and the tube support bar maintains the pole-retention tube in the tensioned fishing position. The second lever end hingedly attaches to the frame bar, enabling the trigger lever to pivotally disengage from the tube support bar and line retention bar.

Thus, when the counter-tension is removed, the tension load from the spring forcibly disengages the tube support bar from the trigger lever, causing the tube support bar to carry the pole-retention tube and the fishing pole to the release hook position.

In another aspect, the holder device further includes a screw hook, the screw hook joining the forward end of the spring to the pole-retention tube.

The device of claim 1, wherein the line retention bar pivots about the trigger end upon detection of the force on the fishing line.

In another aspect of the holder device, the line end of the line retention bar forms a hook that receives the fishing line.

In another aspect of the holder device, the line retention bar is disposed perpendicularly to the tube support bar.

In another aspect, the holder device further includes a junction tab extending perpendicularly from the tube support bar.

In another aspect of the holder device, the first lever end of the trigger lever detachably attaches to the tube support bar and the trigger end of the line retention bar at the junction tab.

device of claim 1, further comprising a lever tension adjustment mechanism comprising a secondary spring and a spring tension adjustment bar, the lever tension adjustment mechanism extending between the frame bar and the trigger lever, the lever tension adjustment mechanism operable to counter the tension load from the spring.

In another aspect of the holder device, the spring tension adjustment bar comprises a screw defined by an eyelet.

In another aspect of the holder device, the holder device further includes a height adjustable stand operable to mount the device on a ground surface.

In another aspect of the holder device, the height adjustable stand comprises a front foot and a rear foot.

In another aspect of the holder device, the height adjustable stand further comprises a fastener subassembly operable to rotatably adjust the elevation of the frame bar relative to the front foot.

In another aspect of the holder device, the fishing pole comprises an elongated pole body terminating at a handle end having a reel, the reel being operable to draw in and reel out the fishing line.

In another aspect of the holder device, the pole-retention tube is sized and dimensioned to receive the handle end of the fishing pole.

In another aspect of the holder device, the distal end of the pole-retention tube is defined by at least one slot, the slot being configured to retain the reel at the handle end of the fishing pole.

One objective of the present invention is to automate the fishing process through a spring-loaded fishing pole holder device that triggers to snag the fish/aquatic specimen when motion is detected along the fishing line.

Another objective is to provide a fishing rod holder that in response to a bite from a fish (or other aquatic animal) automatically jerks back on the line to hook the fish.

Another objective is to secure the reel in a slot at the terminus of the pole-retention tube.

Another objective is to provide hands free fishing experience.

Yet another objective is to allow for multiple fishing line management capacity.

Yet another objective is to provide an efficient means to manually remove the fishing pole from the pole-retainer tube, so as to manually reel in the fish.

Yet another objective is to provide an inexpensive to manufacture automated fishing pole holder.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
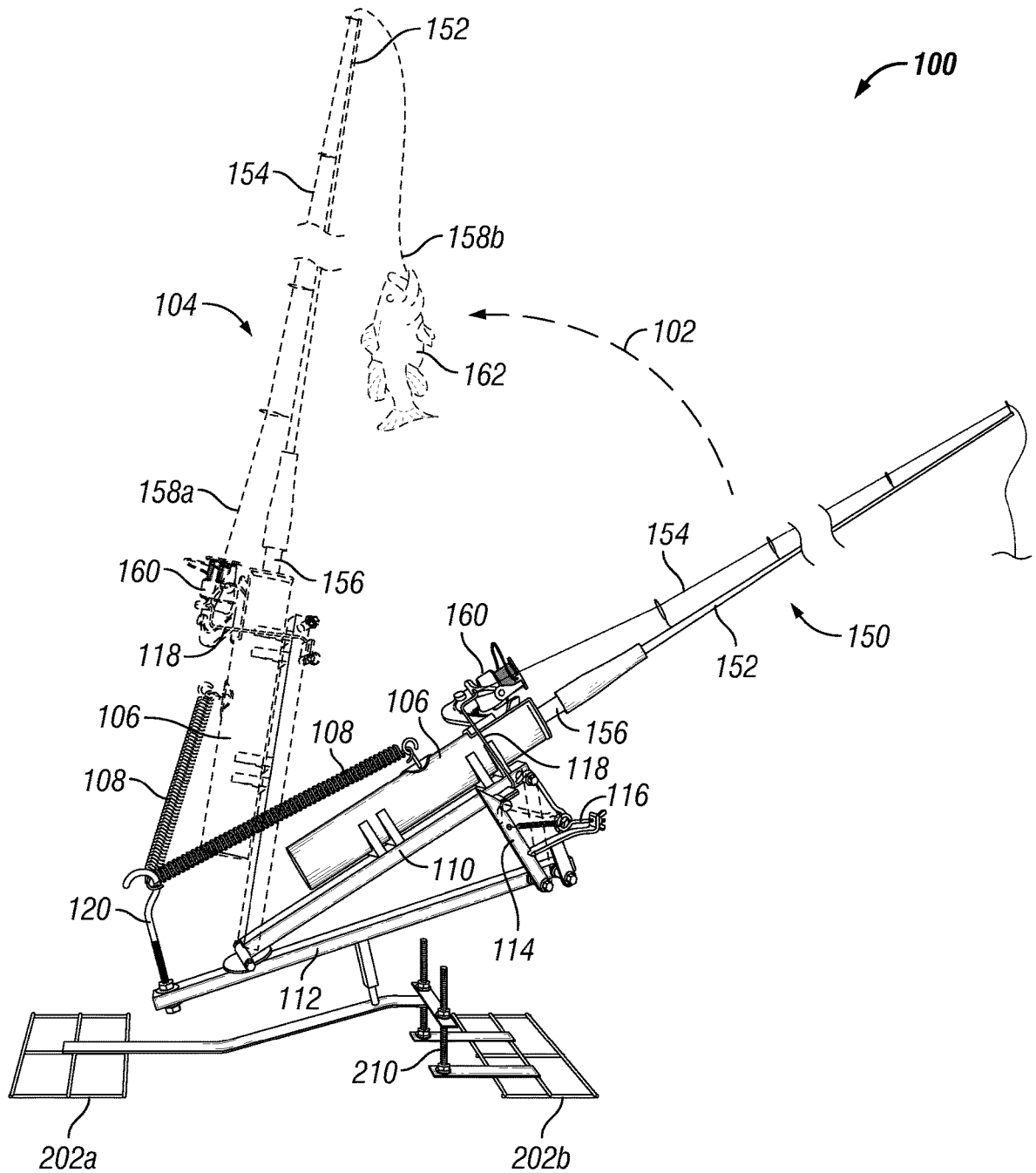
FIG. 1 illustrates a perspective view of an exemplary spring-loaded fishing pole holder device being triggered between a tensioned fishing position and a release hooked position, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A spring-loaded fishing pole holder device 100 and method 500 of operation are referenced in FIGS. 1-5. The fishing pole holding device 100, hereafter "device 100" is configured to retain a fishing pole 150 in a tensioned fishing position 102, and then upon mechanical detection of a force from an aquatic specimen 162 manipulating the distal end 158b of the fishing line 154, i.e. lure, trigger the fishing pole 150 upwardly to a release hooked position 104. The fishing pole 150 may then be removed from the device 100 to manually reel 160 in the specimen 162 with the fishing pole 150. In this manner, automated harvesting of eclectic aquatic specimen 162, i.e., fish, crab, octopus, and the like, is facilitated through a simple, portable mechanical means.

As FIG. 1 references, the holder device 100 comprises a pole-retention tube 106 that is defined by a hollow body 208, a proximal end 204b, and a distal end 204a. The hollow body 208 is sized and dimensioned to receive a fishing pole 150 carrying a fishing line 154. In one non-limiting embodiment, the hollow body 208 comprises a cylindrical shape. In other embodiments, the pole-retention tube 106 is a section of PVC piping.

The fishing pole 150 slidably fits inside the hollow body 208 of the pole-retention tube 106. In one possible embodiment, the fishing pole 150 comprises an elongated pole body 152 terminating at a handle end 156 having a reel 160. The reel 160 includes a standard open-faced, or closed fishing reel known in the art. The reel 160 may be operable to draw in and reel 160 out the fishing line 154. The fishing line 154 has a proximal end 158a that terminates at the reel 160, and an opposing distal end 158b at which the lure and/or aquatic specimen 162 is caught for harvesting.

In one possible embodiment, the pole-retention tube 106 is sized and dimensioned to receive the handle end of the fishing pole 150. As referenced in FIG. 2, the distal end of the pole-retention tube 106 is defined by at least one slot 206 that is configured to retain the reel 160 at the handle end of the fishing pole 150. The slot 206 prevents the pole body 152 from rotating inside the hollow body 208 of the pole-retention tube 106. The slot 206 may have a customized width to accommodate a specific type of reel 160.

In other embodiments, the holder device 100 further comprises a tube support bar 110 defined by a hinged end 220 and a free end 224. The tube support bar 110 attaches to the pole-retention tube 106 in an adjacent, parallel relationship. The tube support bar 110 is operable to pivot about a hinged end 220, automatically pivoting between a tensioned fishing position 102 and a release hooked position 104, while carrying the pole-retention tube 106, and fishing pole 150 therein.

In yet other embodiments, the holder device 100 further comprises a frame bar 112 that supports the tube support bar 110. The frame bar 112 extends beneath the pole-retention bar 106, serving as a fulcrum and enhancing structural rigidity in the device 100. In one embodiment, the frame bar 112 is hingedly joined with the hinge end 220 of the tube support bar 110. In some embodiments, the hinge end 220 may include a bracket hinge that allows for pivotal articulation up to 180°.

In some embodiments, the holder device 100 further comprises a spring 108. The spring 108 is oriented along the longitudinal of the pole-retention tube 106. The spring 108 is defined by a spring tension sufficient to automatically draw back the pole-retention tube 106 to the release hooked position 104, when with the weight of a specimen 162 at the end of the fishing pole 150. The spring tension can be adjusted to apply varying bearing loads on the pole-retention tube 106. Further, the spring 108 can be replaced with a larger or smaller version, so as to affect the tension thereof.

In some embodiments, the spring 108 comprises a rear end 122a and a forward end 122b oriented towards the distal end of the fishing line. The forward end 122b attaches to the pole-retention tube 106. In one non-limiting embodiment, a screw hook 218 joins the forward end 122b of the spring 108 to the pole-retention tube 106. Other fastening mechanisms known in the art of spring connections may also be used.

In yet another embodiment, the spring 108 may include an elongated, coiled member that is configured to apply a tension load 222 on the tube support bar 110. The tension load 222 biases the tube support bar 110 to the release hooked position 104. It is the tension load 222 from the spring 108 tension inherent in the spring 108 that biases the pole-retention tube 106 towards the release hooked position 104, as discussed below.

In some embodiments, the holder device 100 further comprises a spring adjustment bar 120 that attaches to the rear end of the spring 108 and the frame bar 112 from opposing ends. The spring adjustment bar 120 is operable to adjust the tension load 222 on the tube support bar 110. In one non-limiting embodiment, the spring tension adjustment bar 120 comprises a screw defined by an eyelet. The screw can be rotated to increase and decrease the distance between the spring 108 and the frame bar 112. For example, rotating the spring adjustment bar 120 in a first direction (clockwise) increases the spring tension of the spring 108; and rotating the spring adjustment bar 120 in a second direction (counter-clockwise) decreases the spring tension of the spring 108. Other mechanical means to increase and decrease spring tension may also be used. The eyelet is useful for catching the rear end of the spring 108 in a secure manner while the pole-retention tube 106 pivots between positions 102, 104.

In other embodiments, the holder device 100 further comprises a motion-sensitive line retention bar 118 configured to releasably hold the fishing line in a tense arrangement that is released upon detecting motion along the fishing line 154. The forcible motion from the distal end 158b, and along the length of the fishing line 154, such as when a specimen 162 grabs the bait, creates a tense fishing line. This forcible motion consequently causes the line retention bar 118 to pivot forward. As discussed below, this releases the tension load 222 from the spring 108 to pull back on the tube support bar 110.

The line retention bar 118 is defined by a line end 214a and an opposing, lower trigger end 214b. The trigger end 214b pivotally connects to the tube support bar 110. The trigger end 214b joins the tube support bar 110 and a trigger lever 114, as discussed below. In one possible embodiment, the line retention bar 118 is disposed perpendicularly to the tube support bar 110. In another embodiment, the holder device 100 further includes a junction tab 216 extending perpendicularly from the tube support bar 110. The first lever end 126b of the trigger lever 114 is configured to detachably attach to the tube support bar 110 and the trigger end 214b of the line retention bar 118 at the junction tab 216.

The line end 214a is elevated so that the proximal end 158a of the fishing line 154 can be detachably attached thereto. For example, loosely wrapped around a ring, such that a quick, jerking motion, such as a fish snagging a line, disengages the proximal end 158a of the fishing line 154 from the line end 214a of the line retention bar 118. In this manner, the line end 214a works to releasably retain the fishing line 154 in a loosely connected arrangement. In one possible embodiment shown in FIG. 3, the line end 214a of the line retention bar 118 forms a hook that receives the fishing line 154. In other embodiments, the line end 214a can include different grappling mechanisms to detachably attach to the proximal end of the fishing line 154.

The fishing line 154, while being drawn out from the reel 160, creates a counter-tension to the tension load 222 on the tube support bar 110. In this manner, upon detection of a force exerted on the fishing line 154, the line end 214a disengages from the fishing line 154, causing the counter-tension to be removed. Consequently, the line retention bar 118 pivots about the trigger end 214b upon detection of the force on the fishing line 154. This is possible because of the rotating articulation therebetween.

Figure 4:
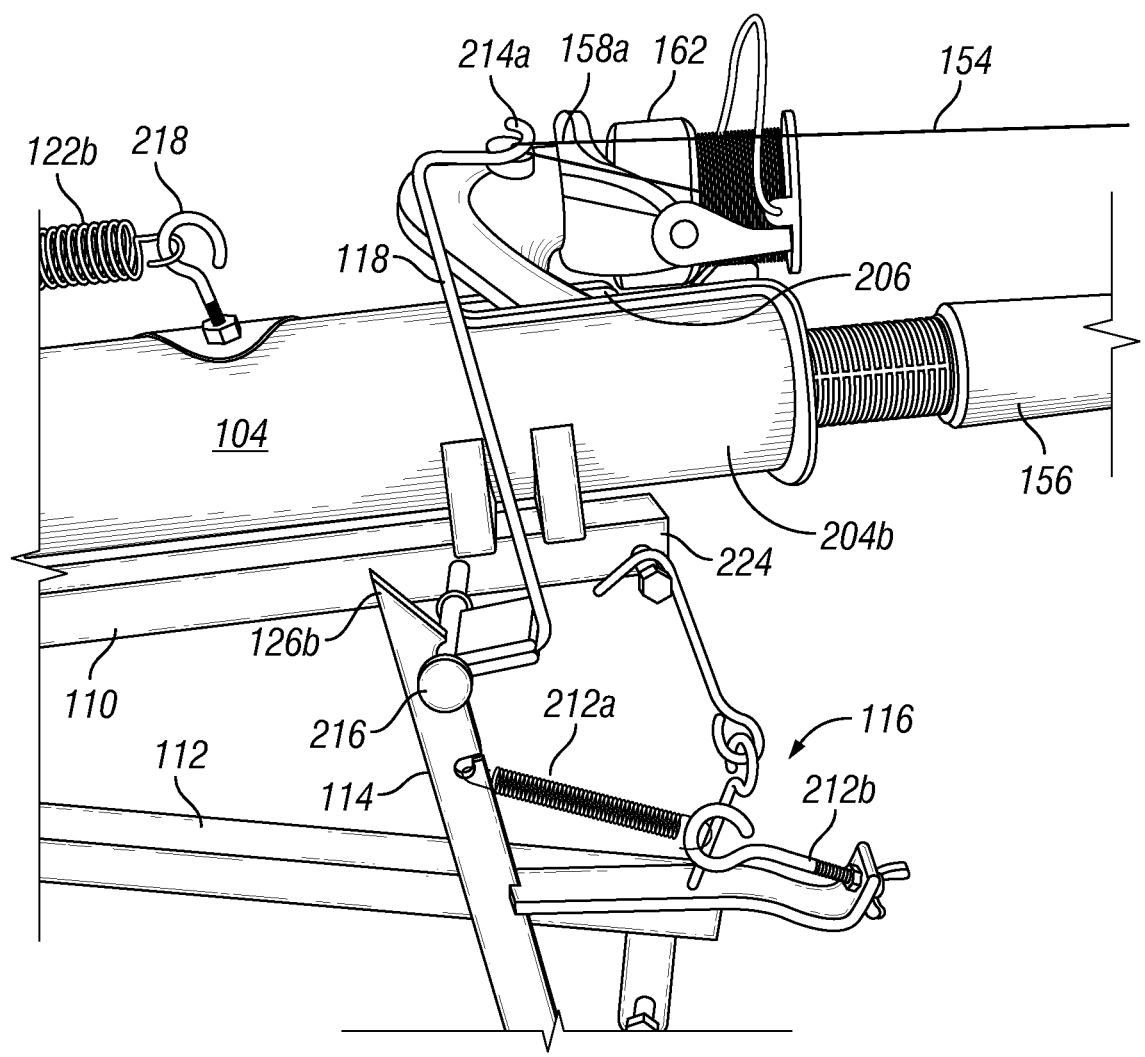
FIG. 4 illustrates a closeup view of an exemplary motion-sensitive line retention bar, a trigger leer, and a pole retention tube operatively connected, in accordance with an embodiment of the present invention.

As referenced in FIG. 4, the holder device 100 further comprises a trigger lever 114 configured to trigger the release of the tube support bar 110 to the release hooked position 104. The trigger lever 114 may include a flat, elongated bar defined by a first lever end 126b and a second lever end 126a. The first lever end 126b detachably attaches to the tube support bar 110 and the trigger end of the line retention bar 118. In this manner, the connection between the trigger lever 114 and the tube support bar 110 maintains the pole-retention tube 106 in the tensioned fishing position 102.

The second lever end 126a hingedly attaches to the frame bar 112, enabling the trigger lever 114 to pivotally disengage from the tube support bar 110 and line retention bar 118. Thus, when the counter-tension is removed, the tension load 222 from the spring 108 forcibly disengages the tube support bar 110 from the trigger lever 114. This causes the tube support bar 110 to carry the pole-retention tube 106 and the fishing pole 150 to the release hooked position 104.

Thus, the forcible motion from the end of the fishing line, such as when a specimen 162 grabs the bait, creates a tense fishing line. This forcible motion consequently causes the line retention bar 118 to pivot forward. The pivoting by the line retention bar 118 causes the first lever end of the trigger lever 114 to disengage from the tube support bar. At this point, the tension load 222 from the spring is released from the pole-retention tube. Free to return to the natural position, the pole-retention tube pivotally articulates to the release hooked position 104, for snagging the specimen 162 with the hook at the end of the fishing line. The fishing pole 150 may then be removed from the pole-retention tube 106 to reel in the specimen 162.

In some embodiments, the holder device 100 also comprises a lever tension adjustment mechanism 116 that extends between the frame bar 112 and the trigger lever 114. The lever tension adjustment mechanism 116 serves to counter the tension load 222 from the spring 108 by adjusting the resistance of the trigger lever 114, relative to the tension load 222.

In some embodiments, the lever tension adjustment mechanism 116 may utilize a secondary spring 212a and a corresponding spring tension adjustment bar 212b, such as an elongated threaded screw. The spring tension adjustment bar 212b can rotatably advance through the secondary spring 212a to adjust the spring tension for the trigger lever 114. This can be useful for accommodating the device 100 for differently sized aquatic specimens, and springs.

In one non-limiting embodiment, shown in FIG. 4, a first hooked end of secondary spring 212a passes through a slot in the trigger lever 114. The slot facilitates ingress/egress of secondary spring to trigger lever 114. In another non-limiting embodiment, spring tension adjustment bar 212b is a bar terminating at an eyelet. The eyelet forms a small gap/opening that facilitates connection and disconnection with a second hooked end of the secondary spring 212a.

Figure 2:
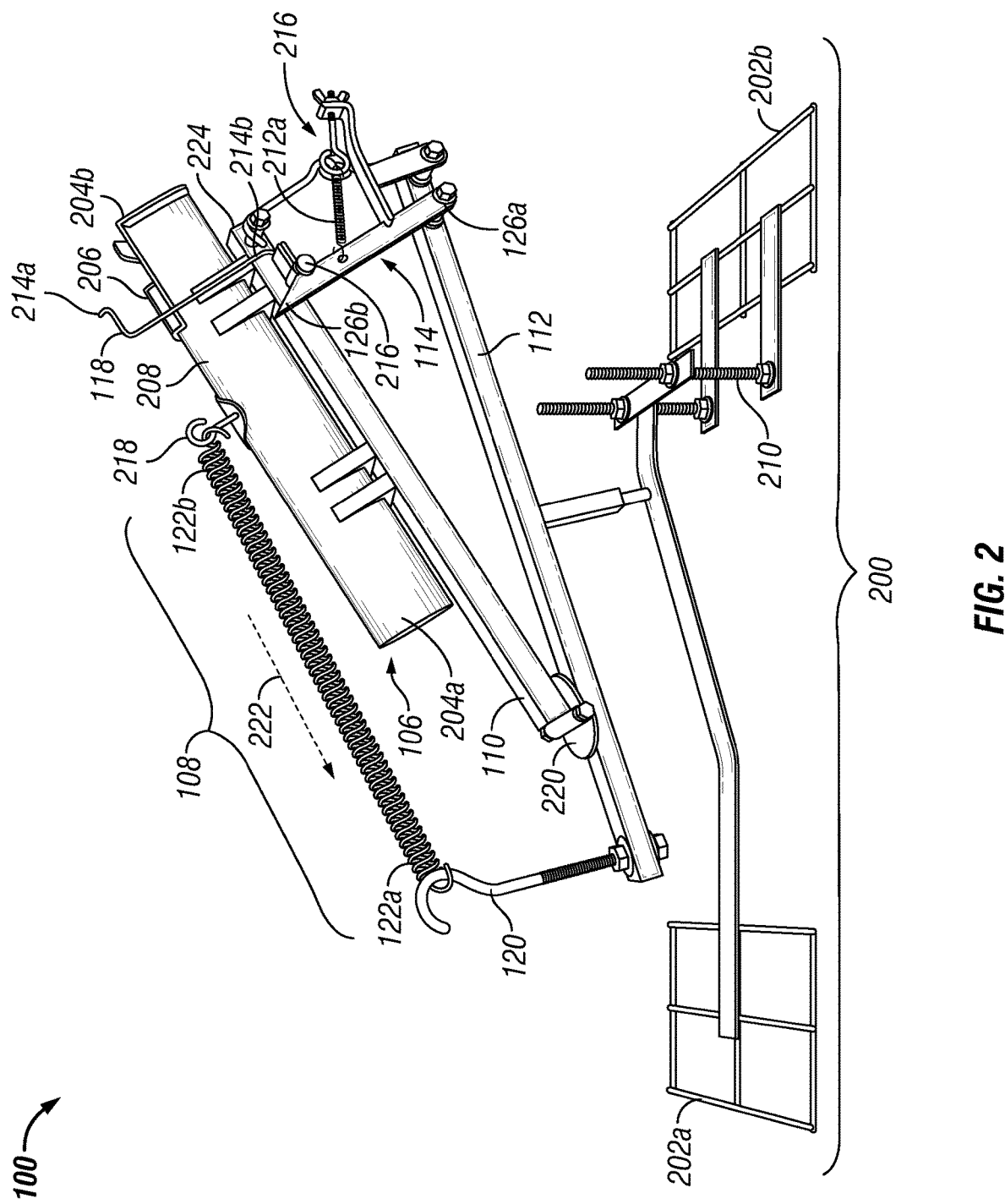
FIG. 2 illustrates a perspective view of the fishing pole holder device shown in FIG. 1, showing the tensioned fishing position, in accordance with an embodiment of the present invention.
Figure 3:
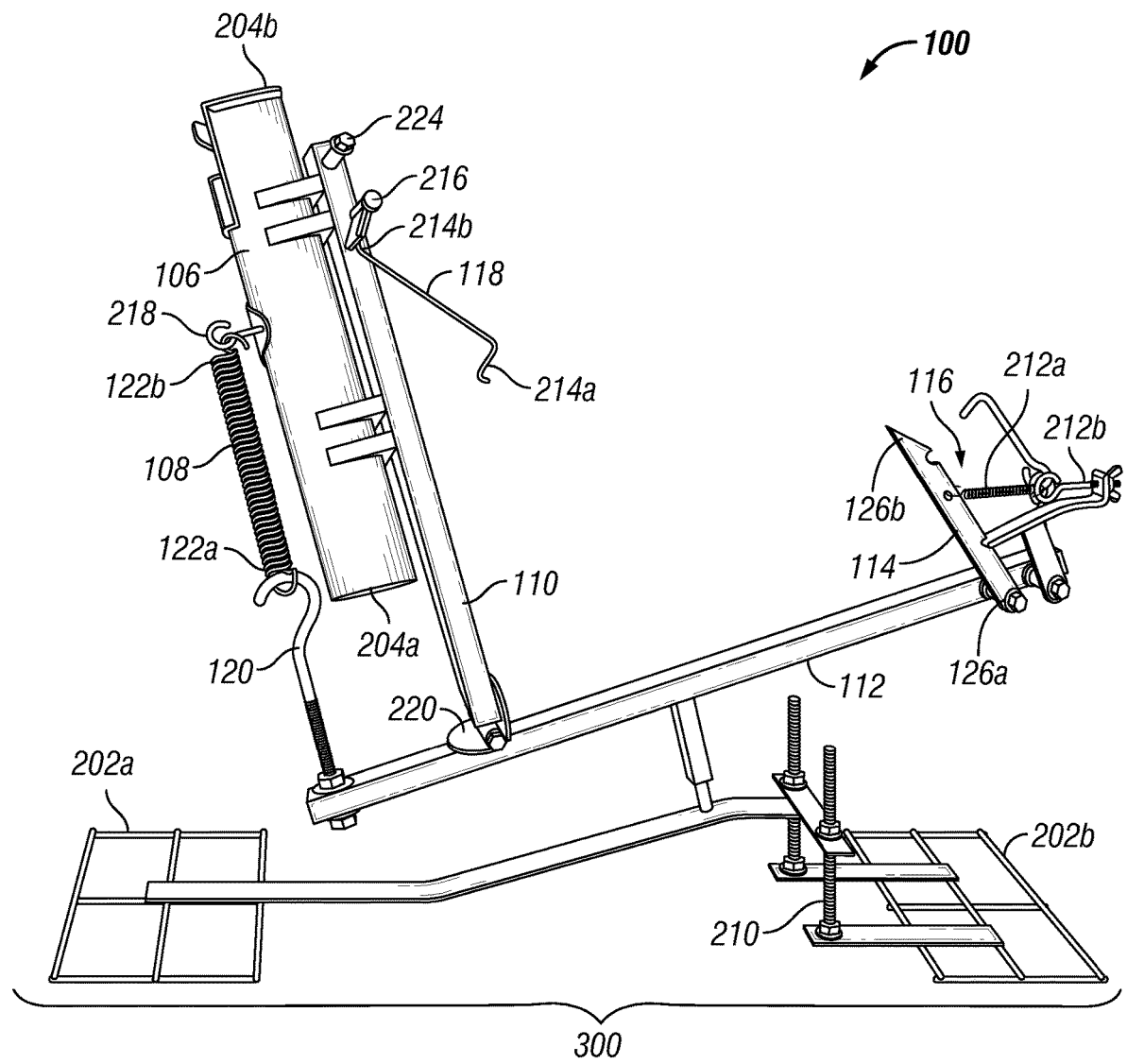
FIG. 3 illustrates a perspective view of the fishing pole holder device shown in FIG. 1, showing the release hooked position, in accordance with an embodiment of the present invention.

Looking back at FIG. 2, the holder device 100 further includes a height adjustable stand 200 that is operable to mount the device 100 on a ground surface. The height adjustable stand provides an even foundation for operating the fishing pole 150. This provides the foundation for support during the fishing process. In some embodiments, the height adjustable stand 200 comprises a front foot 202b and a rear foot 202a, wherein the front foot 202b is oriented towards the distal end 158b of the fishing line 154.

In some embodiments, frame bar 112 is removably attached to a support rod (not shown) that is driven into the ground to support the holder device 100. Preferably the support rod is a 17" steel rod. In this manner, the fisherman has the option of using either a support rod or the adjustable stand 200, depending on fishing conditions and the fisherman's preference.

In other embodiments, the height adjustable stand 200 further comprises a fastener subassembly 210 that works to rotatably adjust the elevation of the frame bar 112, relative to the front foot 202b. The fastener subassembly 210 may include a pair of threaded, rotatable screws that advance and retreat through corresponding nuts and washers. In this manner, the elevation of the front foot 202b of the stand 200 can be adjusted to accommodate different ground surface types. For example, fishing off a boat might require a different elevation, or front lift, than fishing off a sloped river bank.

Figure 5:
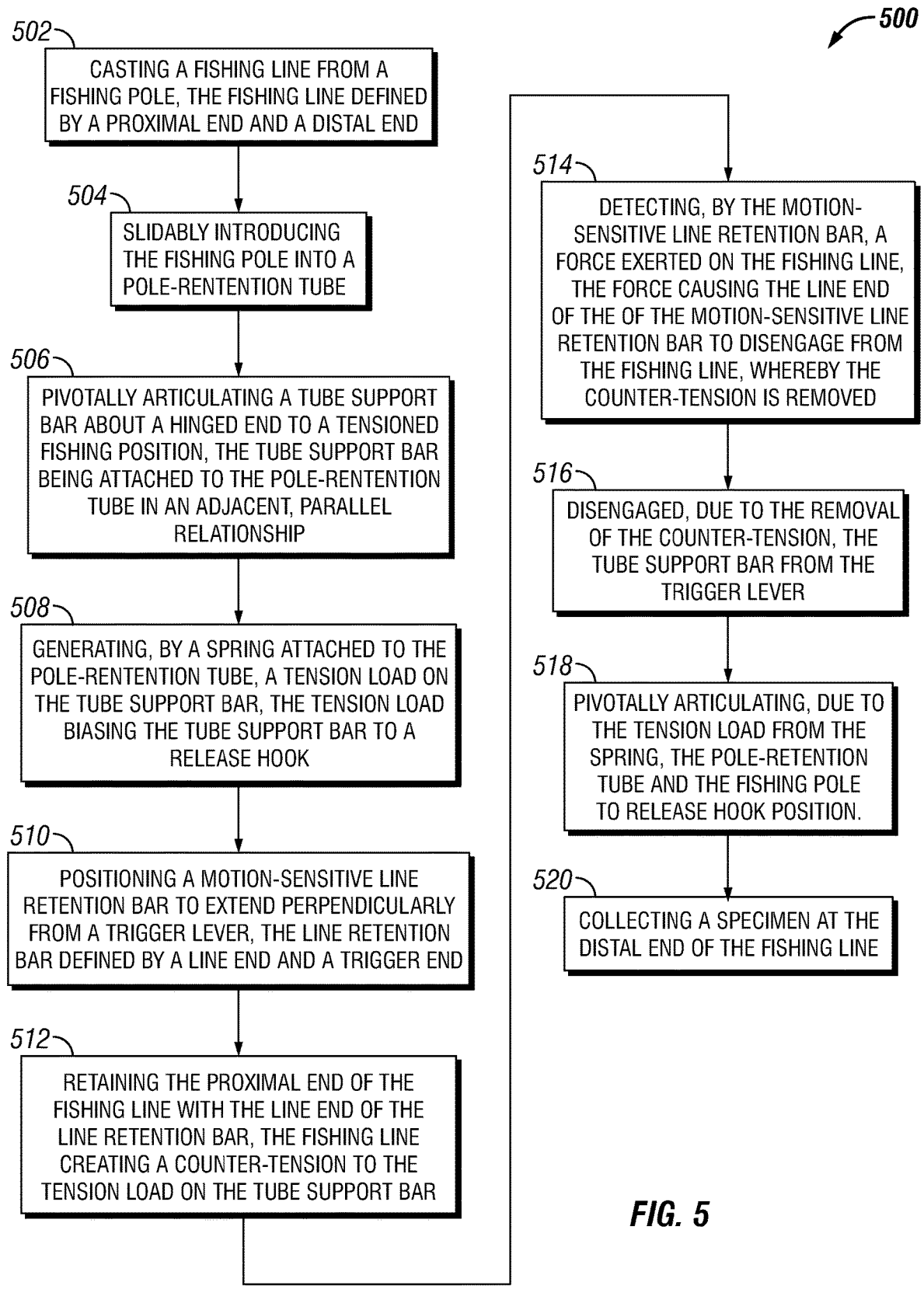
FIG. 5 illustrates a flowchart diagram of an exemplary method for operating a fishing pole holder, in accordance with an embodiment of the present invention.

FIG. 5 illustrates a flowchart diagram of an exemplary method 500 for operating a fishing pole holder. The method 500 works to retain a fishing pole in a fishing position by a tension-adjustable, interchangeable spring, and upon mechanical detection of the fish taking the bait, a trigger subassembly triggers the fishing rod to automatically articulate upward to a hooked position using the tension load applied by the spring; whereby the fishing pole may then be removed from the device to manually reel in the fish. The method 500 may include an initial Step 502 of casting a fishing line from a fishing pole, the fishing line defined by a proximal end and a distal end. The method 500 may further comprise a Step 504 of slidably introducing the fishing pole into a pole-retention tube.

A Step 506 includes pivotally articulating a tube support bar about a hinged end to a tensioned fishing position, the tube support bar being attached to the pole-retention tube in an adjacent, parallel relationship. In some embodiments, a Step 508 comprises generating, by a spring attached to the pole-retention tube, a tension load on the tube support bar, the tension load biasing the tube support bar to a release hook position. A Step 510 includes positioning a motion-sensitive line retention bar to extend perpendicularly from a trigger lever, the line retention bar defined by a line end and a trigger end.

In some embodiments, a Step 512 may include retaining the proximal end of the fishing line with the line end of the line retention bar, the fishing line creating a counter-tension to the tension load on the tube support bar. A Step 514 comprises detecting, by the motion-sensitive line retention bar, a force exerted on the fishing line, the force causing the line end of the motion-sensitive line retention bar to disengage from the fishing line, whereby the counter-tension is removed.

The method 500 may further comprise a Step 516 of disengaging, due to the removal of the counter-tension, the tube support bar from the trigger lever. A Step 518 includes pivotally articulating, due to the tension load from the spring, the pole-retention tube and the fishing pole to the release hook position. A final Step 520 includes collecting a specimen at the distal end of the fishing line. The fishing pole is removed from the device 100 for the reeling in and harvesting processes.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

For purposes of this invention, the bars, springs, and fasteners described above may have different shapes, sizes, dimensions, and nomenclature. This is because of the interchangeability of hardware and the scalability of the device 100, which enables automated snagging and harvesting of an eclectic array aquatic specimen 162, i.e., fish, crab, octopus, and the like. For example, one list of bars, springs, and fasteners may include, without limitation:

A FREE-STANDING STAND comprising:
2=WIRE GRID (4"×8" long) (3/16" wire)=
2=MOUNTING PLATES (3/4"×4½" long with 5/16" hole) (1/8" flat metal)
2=CARRIAGE BOLTS (1/4"×4" long with MOUNTING HARDWARE)
2=1/4" LOCK WASHERS
2=1/4" NUTS
4=1/4" FLAT WASHERS
4=1/4" WINGNUTS
1=MOUNTING BRACKET (3/4"×4¾" long with 5/16" hole and 1/8" FLAT METAL)
1=MOUNTING BRACKET (1"×16" long with 3/8" hole) (1/8" FLAT METAL)
1=MOUNTING ROUND ROD (3/8"×3" long)
STAKE STAND
  1=STAKE (5×16" ROUND ROD, 17" LONG)
  1=ROD STABILIZER (3/4"×1½" long) (1/8" FLAT METAL)
A BOTTOM SECTION comprising:
1=SQUARE TUBING (0.065⅝"×⅝" and 19" long)
MOUNTING HOLES (3/16", 2¼", 1⅜")
1=EYE BOLT (3/8"×6" long)
MOUNTING HARDWARE comprising:
2=3/8" NUTS
2=3/8" FLAT WASHERS
1=SQUARE TUBING (0.065⅜"×⅜"×2" long with 1/4" hole)
1=NUT (1/4")
1=T-BOLT (1/4"×1" long)
SAFETY LATCH comprising:
1=EYE BOLT (3" long×3/16")
2=NUTS (#10-24)
1=SAFETY HOOK (1/8"×3½" long WIRE)
1=PIN (3/16"×1⅝" long)
TRIGGER MECHANISM comprising:
MOUNTING HARDWARE
4=LOCK WASHERS (1/4")
2=NUTS (1/4")
4=LOCKING NUTS (1/4")
TRIGGER SENSITIVITY ADJUSTMENT
1=METAL PLATE (½"×2¾" long, 3/32" thick, and with 1/4" hole)
1=MOUNTING BRACKET
METAL PLATE (½"×3½" long with 3/16" hole)
1=UTILITY SPRING (1/4"×1⅞" long×0.035")
1=EYE BOLT (3/16"×2" long)
1=#10-24 NUT
1=#10-24 WING NUT
TRIGGER SYSTEM
1=DOG
  FLAT METAL
  ½"×5½" LONG (1/8" metal with 1/4" hole with 3/16" hole, with 3/16" slot, and 30° angled end)
1=PIN (3/16"×3" long)
1=METAL SLEEVE (1/4"×3/4" long)
2=FLAT WASHERS (3/16")
1=TRIGGER
  #110 MB W/BOLT & NUT
1=STAINLESS STEEL TRIGGER WIRE (1/16"×6¼" long)
TOP SECTION comprising:
1=SQUARE TUBING (0.065⅝"×⅝" and 15" long with two 3/16" holes)
1=WELD ON HINDGE (2"×2")
1=STOP (flat metal 1/8" metal, 3/4"×1½" long)
1=FISHING ROD HOLDER (12" long)
2=SELF TAPPING SCREWS (#8×1")
2=FINDER WASHERS (1" with 3/16" hole)
1=EYE BOLT (3/16"×1½" long)
2=NUTS (#10-24)
1=SPRING (FOR HEAVY HOOK SET) (HILLMAN #58 about 6" long)
1=SPRING (LIGHT HOOK SET) CENTURY #C-231 (9/16"×6" long 0.072)

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A spring-loaded fishing pole holder, the spring-loaded fishing pole holder comprising:
a pole-retention tube defined by a hollow body, a proximal end, and a distal end, the hollow body being sized and dimensioned to receive a fishing pole carrying a fishing line;
a tube support bar defined by a hinged end and a free end, the tube support bar attached to the pole-retention tube in an adjacent, parallel relationship, the pole-retention tube being operable to pivot about the hinged end between a tensioned fishing position and a release hooked position;
a frame bar supporting the tube support bar, the frame bar hingedly joined with the hinged end of the tube support bar;
a spring defined by a spring tension, the spring comprising a rear end and a forward end, the forward end attached to the pole-retention tube, the spring applying a tension load on the tube support bar, the tension load biasing the tube support bar to the release hooked position;
a spring adjustment bar attached to the rear end of the spring and the frame bar, the spring adjustment bar operable to adjust the tension load on the tube support bar;
a motion-sensitive line retention bar defined by a line end and a trigger end, the line end releasably retaining the fishing line, the fishing line creating a counter-tension to the tension load on the tube support bar, whereby upon detection of a force exerted on the fishing line, the line end disengages from the fishing line, causing the counter-tension to be removed; and a trigger lever defined by a first lever end and a second lever end, the first lever end detachably attached to the tube support bar and the trigger end of the line retention bar, the second lever end hingedly attached to the frame bar, whereby the attachment between the trigger lever and the tube support bar maintains the pole-retention tube in the tensioned fishing position, whereby, when the counter-tension is removed, the tension load from the spring forcibly disengages the tube support bar from the trigger lever, causing the tube support bar to carry the pole-retention tube and the fishing pole to the release hooked position.

2. The spring-loaded fishing pole holder of claim 1, further comprising a screw hook, the screw hook joining the forward end of the spring to the pole-retention tube.

3. The spring-loaded fishing pole holder of claim 1, wherein the line retention bar pivots about the trigger end upon detection of the force on the fishing line.

4. The spring-loaded fishing pole holder of claim 1, wherein the line end of the line retention bar forms a hook that receives the fishing line.

5. The spring-loaded fishing pole holder of claim 1, wherein the line retention bar is disposed perpendicularly to the tube support bar.

6. The spring-loaded fishing pole holder of claim 1, further comprising a junction tab extending perpendicularly from the tube support bar.

7. The spring-loaded fishing pole holder of claim 6, wherein the first lever end of the trigger lever detachably attaches to the tube support bar and the trigger end of the line retention bar at the junction tab.

8. The spring-loaded fishing pole holder of claim 1, further comprising a lever tension adjustment mechanism comprising a secondary spring and a spring tension adjustment bar, the lever tension adjustment mechanism extending between the frame bar and the trigger lever, the lever tension adjustment mechanism operable to counter the tension load from the spring.

9. The spring-loaded fishing pole holder of claim 8, wherein the spring tension adjustment bar comprises a screw defined by an eyelet.

10. The spring-loaded fishing pole holder of claim 1, further comprising a height adjustable stand operable to mount the spring-loaded fishing pole holder on a ground surface.

11. The spring-loaded fishing pole holder of claim 10, wherein the height adjustable stand comprises a front foot and a rear foot.

12. The spring-loaded fishing pole holder of claim 11, wherein the height adjustable stand further comprises a fastener subassembly operable to rotatably adjust an elevation of the frame bar relative to the front foot.

13. The spring-loaded fishing pole holder of claim 1, wherein the fishing pole comprises an elongated pole body terminating at a handle end having a reel, the reel being operable to draw in and reel out the fishing line.

14. The spring-loaded fishing pole holder of claim 13, wherein the pole-retention tube is sized and dimensioned to receive the handle end of the fishing pole.

15. The spring-loaded fishing pole holder of claim 14, wherein the distal end of the pole-retention tube is defined by at least one slot, the slot being configured to retain the reel at the handle end of the fishing pole.

16. A spring-loaded fishing pole holder, the spring-loaded fishing pole holder comprising:

a pole-retention tube defined by a hollow body, a proximal end, and a distal end, the hollow body being sized and dimensioned to receive a fishing pole carrying a fishing line, the distal end being defined by at least one slot;

a tube support bar defined by a hinged end and a free end, the tube support bar attached to the pole-retention tube in an adjacent, parallel relationship, the pole-retention tube being operable to pivot about the hinged end between a tensioned fishing position and a release hooked position;

a junction tab extending perpendicularly from the tube support bar;

a frame bar supporting the tube support bar, the frame bar hingedly joined with the hinged end of the tube support bar;

a spring defined by a spring tension, the spring comprising a rear end and a forward end, the forward end attached to the pole-retention tube, the spring applying a tension load on the tube support bar, the tension load biasing the tube support bar to the release hooked position;

a spring adjustment bar attached to the rear end of the spring and the frame bar, the spring adjustment bar operable to adjust the tension load on the tube support bar;

a motion-sensitive line retention bar defined by a line end and a trigger end, the line end releasably retaining the fishing line, the fishing line creating a counter-tension to the tension load on the tube support bar, whereby upon detection of a force exerted on the fishing line, the line end disengages from the fishing line, causing the counter-tension to be removed;

a trigger lever defined by a first lever end and a second lever end, the first lever end detachably attached to the tube support bar and the trigger end of the line retention bar at the junction tab, the second lever end hingedly attached to the frame bar, whereby the attachment between the trigger lever and the tube support bar maintains the pole-retention tube in the tensioned fishing position, whereby, when the counter-tension is removed, the tension load from the spring forcibly disengages the tube support bar from the trigger lever, causing the tube support bar to carry the pole-retention tube and the fishing pole to the release hooked position;

a lever tension adjustment mechanism comprising a secondary spring and a spring tension adjustment bar, the lever tension adjustment mechanism extending between the frame bar and the trigger lever, the lever tension adjustment mechanism operable to counter the tension load from the spring; and a height adjustable stand operable to mount the spring-loaded fishing pole holder on a ground surface, the height adjustable stand comprising a front foot and a rear foot, the height adjustable stand further comprising a fastener subassembly operable to rotatably adjust an elevation of the frame bar relative to the front foot.

17. The spring-loaded fishing pole holder of claim 16, wherein the spring tension adjustment bar comprises a screw defined by an eyelet.

18. The spring-loaded fishing pole holder of claim 16, further comprising a screw hook, the screw hook joining the forward end of the spring to the pole-retention tube.

19. The spring-loaded fishing pole holder of claim 16, wherein the line retention bar pivots about the trigger end upon detection of the force on the fishing line.

20. A method for operating a spring-loaded fishing pole holder, the method comprising:

providing the spring-loaded fishing pole holder of claim 1, casting the fishing line from the fishing pole, the fishing line defined by a proximal end and a distal end;

slidably introducing the fishing pole into the pole-retention tube;

pivotally articulating the tube support bar about the hinged end to the tensioned fishing position;

generating, by the spring attached to the pole-retention tube, the tension load on the tube support bar, the tension load biasing the tube support bar to the release hooked position;

positioning the motion-sensitive line retention bar to extend perpendicularly from the trigger lever;

retaining the proximal end of the fishing line with the line end of the line retention bar, the fishing line creating the counter-tension to the tension load on the tube support bar;

detecting, by the motion-sensitive line retention bar, the force exerted on the fishing line, the force causing the line end of the motion-sensitive line retention bar to disengage from the fishing line, whereby the counter-tension is removed;

disengaging, due to the removal of the counter-tension, the tube support bar from the trigger lever;

pivotally articulating, due to the tension load from the spring, the pole-retention tube and the fishing pole to the release hooked position; and collecting a specimen at the distal end of the fishing line.

\* \* \* \* \*